US009020549B2

(12) United States Patent
Acharya et al.

(10) Patent No.: US 9,020,549 B2
(45) Date of Patent: Apr. 28, 2015

(54) CONFIGURATION OF PILOT SIGNALS BY NETWORK FOR ENABLING COMP

(75) Inventors: Joydeep Acharya, Sunnyvale, CA (US);
Long Gao, Santa Clara, CA (US);
Sudhanshu Gaur, Santa Clara, CA (US)

(73) Assignee: Hitachi, Ltd., Tokyo (JP)

(*) Notice: Subject to any disclaimer, the term of this patent is extended or adjusted under 35 U.S.C. 154(b) by 184 days.

(21) Appl. No.: 13/561,766

(22) Filed: Jul. 30, 2012

(65) Prior Publication Data

US 2013/0303220 A1 Nov. 14, 2013

Related U.S. Application Data

(63) Continuation-in-part of application No. 13/468,316, filed on May 10, 2012.

(51) Int. Cl.
*H04B 7/00* (2006.01)
*H04W 88/18* (2009.01)

(52) U.S. Cl.
CPC .................................. *H04W 88/18* (2013.01)

(58) Field of Classification Search
CPC .. H04W 72/082; H04W 24/10; H04W 84/045
USPC .................................................. 455/443, 509
See application file for complete search history.

(56) References Cited

U.S. PATENT DOCUMENTS 8,665,692 B2 * 3/2014 Koivisto et al. ............... 370/204
2010/0273502 A1 * 10/2010 Uemura et al. ............ 455/452.2

OTHER PUBLICATIONS

3GPP TS 36.213 V10.4.0, "Evolved Universal Terrestrial Radio Access(E-UTRA); Physical layer procedures."
3GPP TR 36.819 V11.1.0, "Coordinated multi-point operation for LTE physical layer aspects."

* cited by examiner

*Primary Examiner* — Tu X Nguyen
(74) *Attorney, Agent, or Firm* — Procopio, Cory, Hargreaves & Savitch LLP

(57) ABSTRACT

Example embodiments described herein are directed to systems and methods by which a group of base stations (BS) can configure pilot signals in time and time-frequency, using interference management resources (IMR) and/or channel state information reference signal (CSI-RS) resources, so that the user equipment (UE) such as mobiles and laptops can measure certain possible channel quality indicators (CQI) that correspond to specific channel and interference conditions that can arise during actual data submission. Using these values, example embodiments utilize an interpolation algorithm by which the group of base stations can estimate other possible CQI corresponding to a different set of channel and interference conditions.

20 Claims, 17 Drawing Sheets

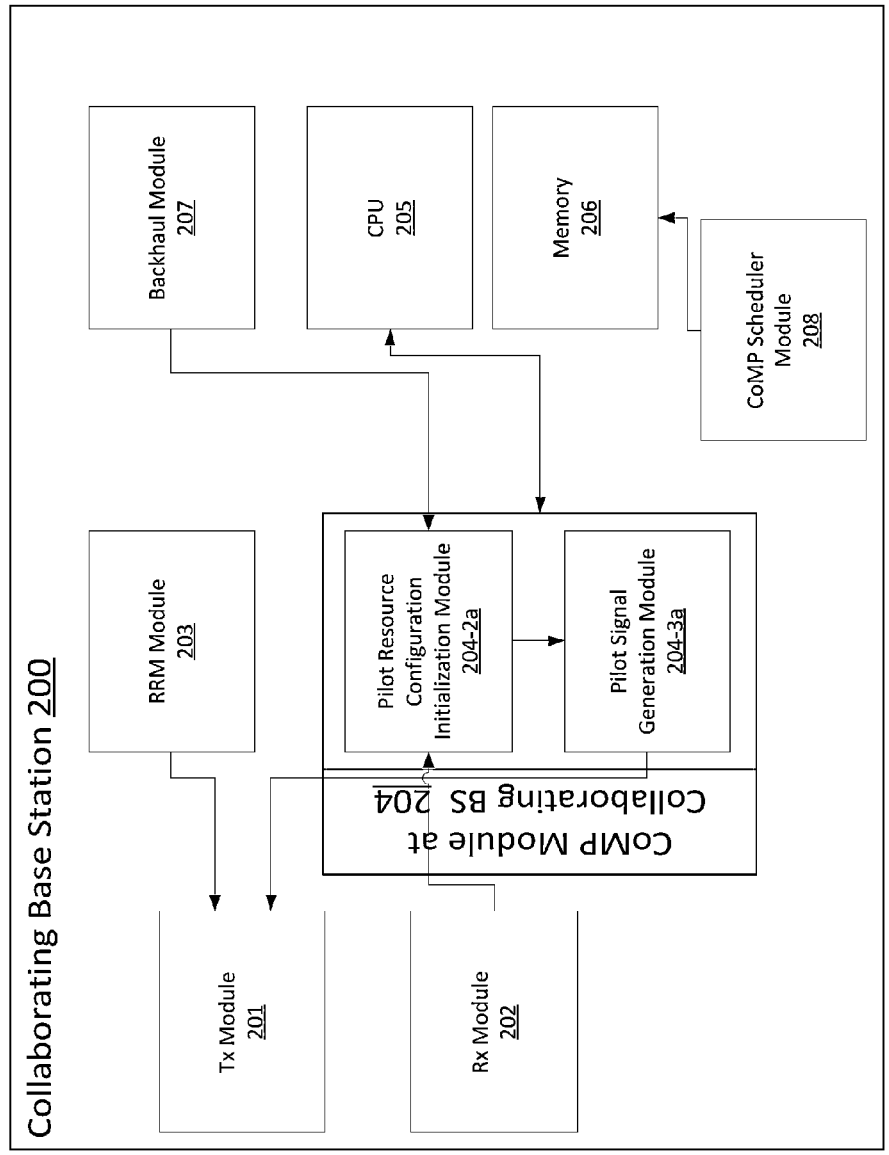

FIG. 6

| Signaling BS/Set of Interfering BS | | | |
|---|---|---|---|
| BS 1 | S11 | S12 | S1L |
| Signaling BS/Set of Interfering BS | | | |
| BS 2 | S21 | S22 | S2L |
| Signaling BS/Set of Interfering BS | | | |
| BS N | SN1 | SN2 | SNL |

600

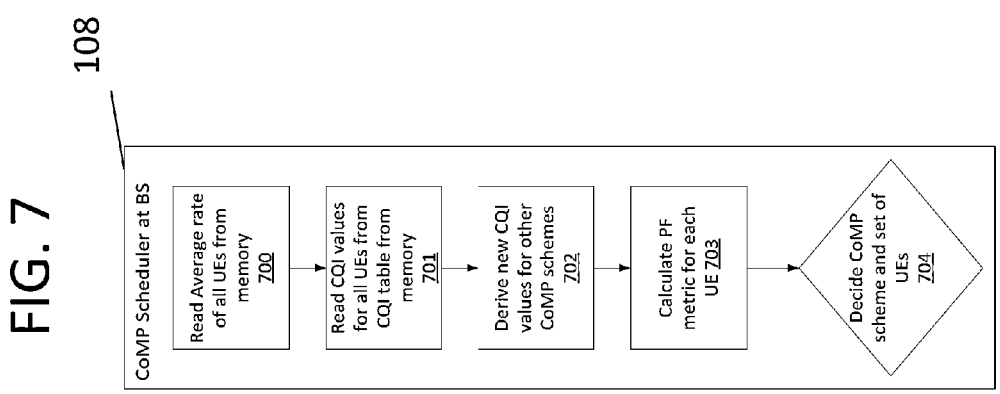

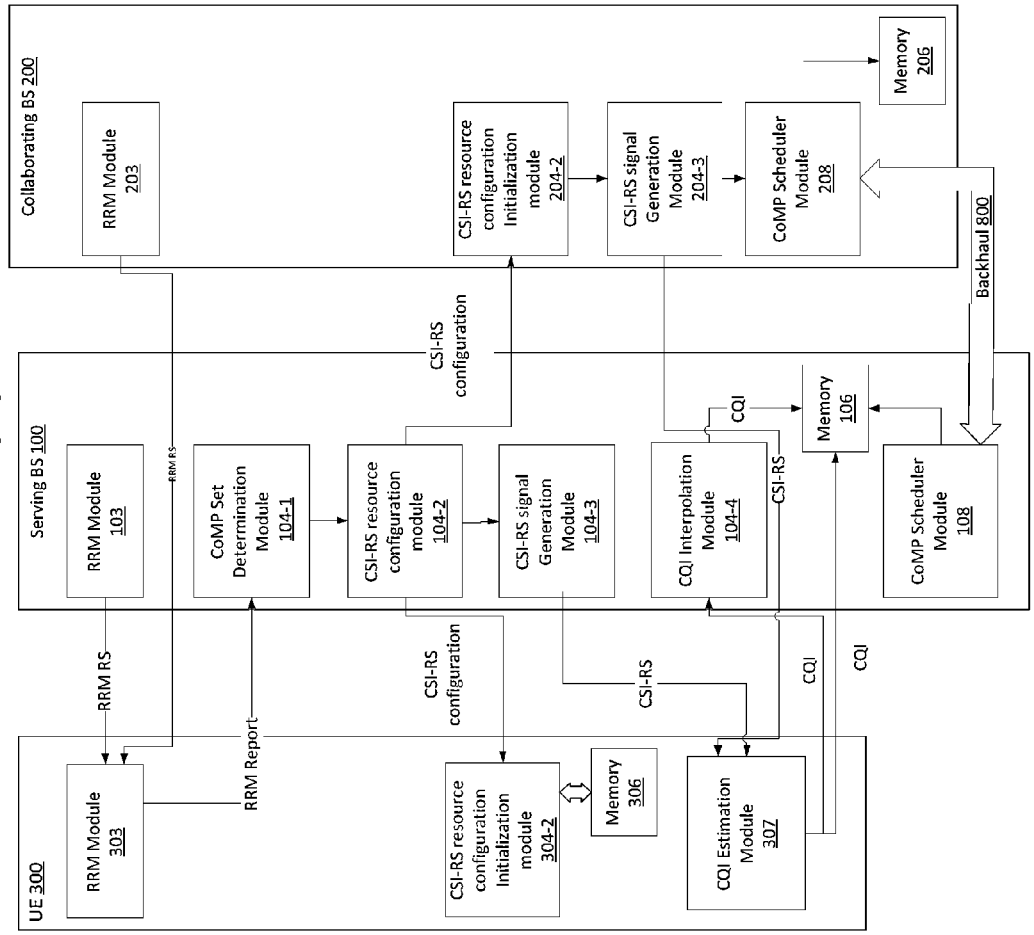

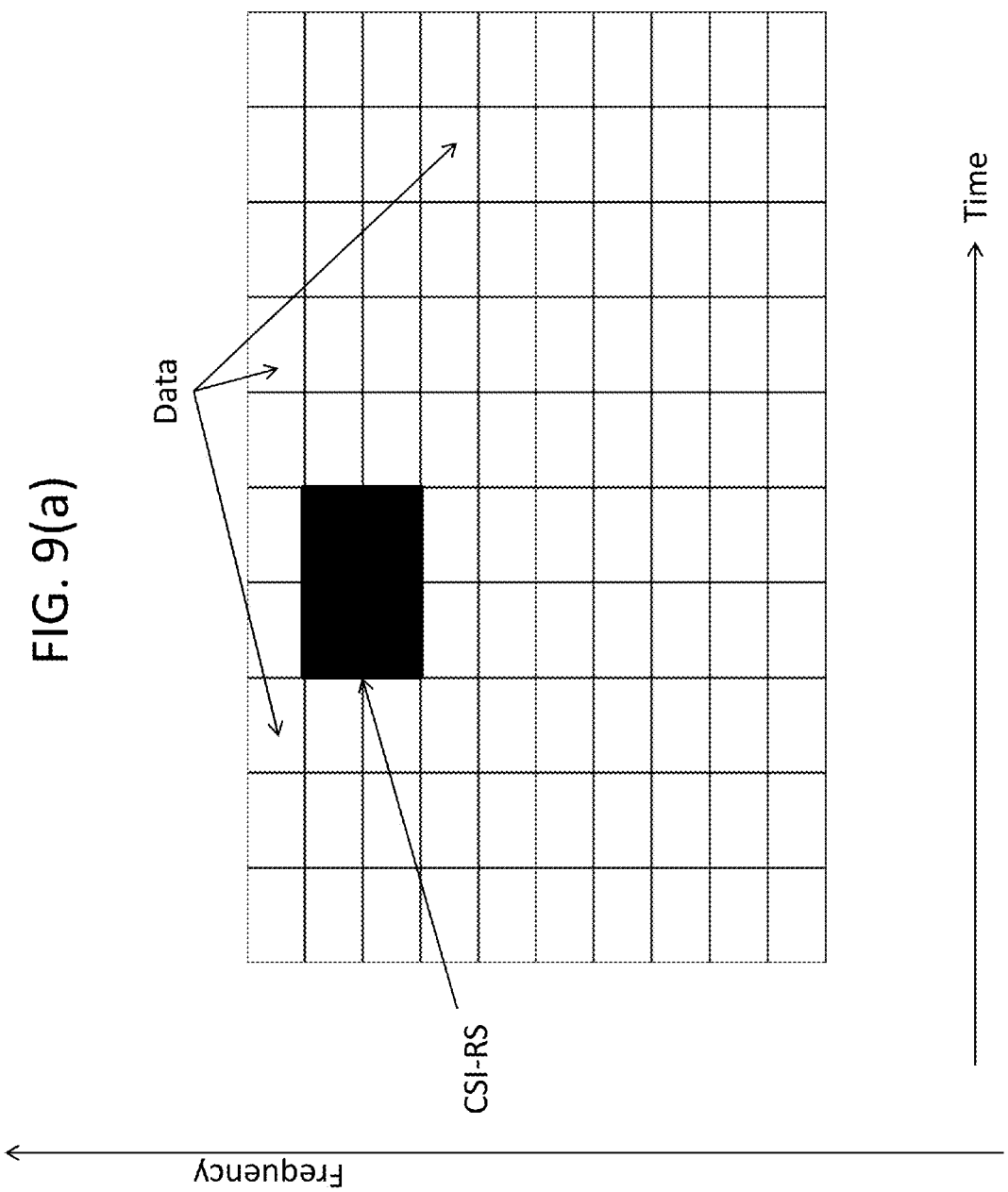

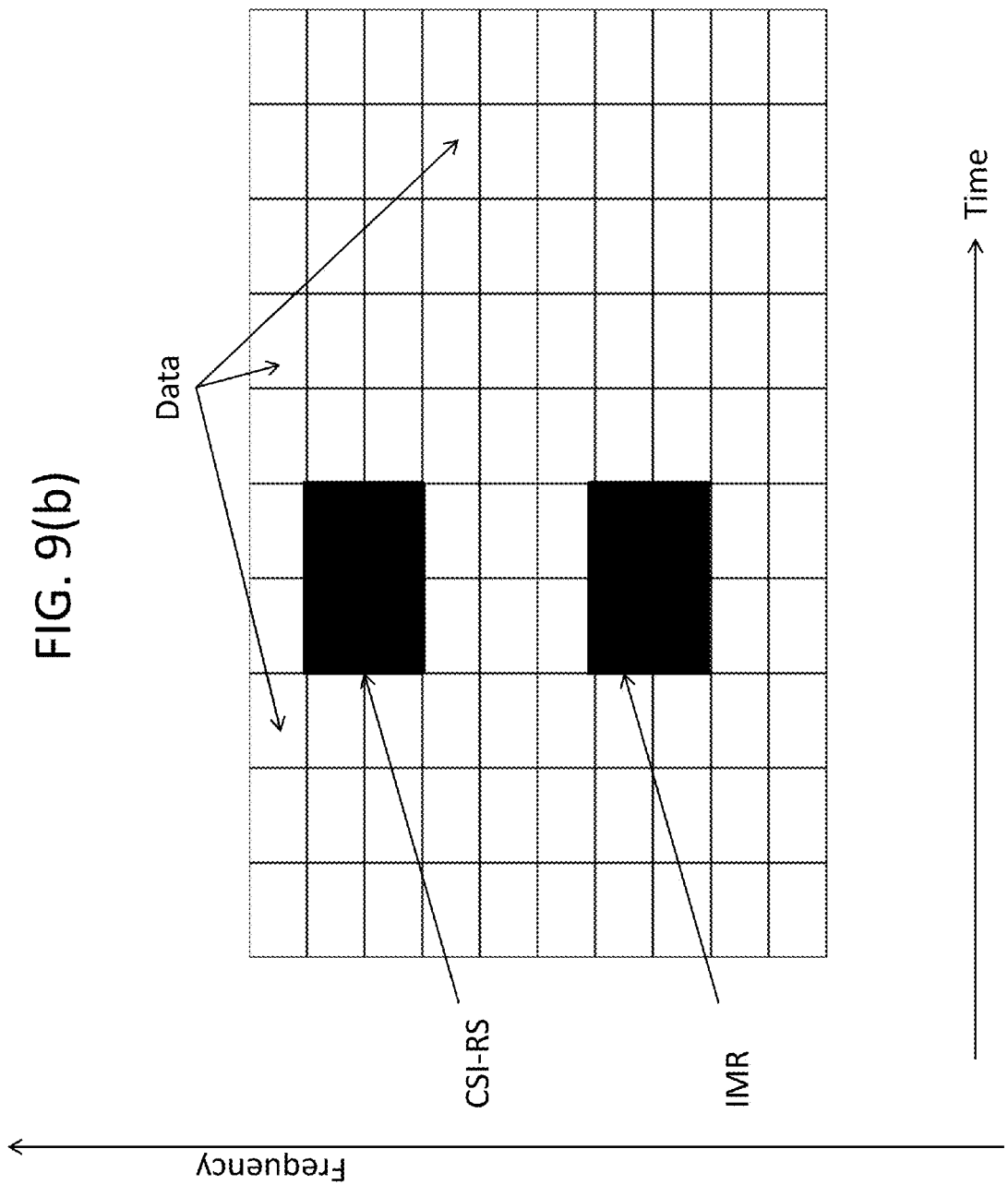

CONFIGURATION OF PILOT SIGNALS BY NETWORK FOR ENABLING COMP

CROSS-REFERENCE TO RELATED APPLICATION

This U.S. patent application is a continuation-in-part of U.S. application Ser. No. 13/468,316 filed on May 10, 2012, which is fully incorporated herein by reference in its entirety for all purposes.

BACKGROUND

1. Field

Example embodiments are generally directed to communication networks, and more specifically, wireless communication networks involving serving and collaborating base stations.

2. Related Art

Using coordinated multipoint transmission reception (CoMP) technology, a group of base stations (BS) can potentially transmit to user equipment (UE). The group of base stations that potentially transmit to a given UE is known as the CoMP cooperating set of the given UE. During actual transmission, one or more of these BS in the cooperating set can transmit to a given UE. The other BS in the cooperating set may be silent (e.g., not transmitting) or transmitting to other UEs, which may cause interference to the given UE. The state of each BS (e.g., transmitting, not transmitting) may change over time. The UE may measure the channel and interference conditions for a given transmission, so that the UE can measure the downlink signal to interference plus noise ratio (SINR). The SINR may be used to pick a CQI (channel quality indicator) value, which is a modulation scheme with a coding rate.

The Long Term Evolution (LTE) transmit signal is two dimensional in time and frequency, and is composed of multiple time resource elements (RE). Each RE is a two dimensional tile with a duration of roughly 71 microseconds in time and a frequency of 15 kilohertz (KHz). For purposes of channel and interference measurement leading to CQI calculation, the BS can configure certain REs with pilot signals. These REs are called channel state information reference signal (CSI-RS) resources. The transmission can be explained by the following equation which is the received signal y in a given CSI-RS resource.

$$y = Hs + I + n \quad (1)$$

where H is the channel to be estimated, s is the transmit pilot signal which is known at the transmitter and receiver. I+n is the interference and noise as measured by the UE, which may include interference from other BS in the CoMP coordinating set as well as noise and interference from BS outside of the CoMP set. The UE first estimates H from received y and from s. Let the estimate be $H_{est}$. The interference I during channel estimation is directly proportional to the number of interfering base stations while the desired base station is transmitting CSI-RS. For conducting channel estimation, the network may mute the transmissions of most of these base stations during CSI-RS transmission. Muting the transmissions sets I=0, thereby providing an estimate of interference-less channel $H_{est}$.

To estimate the interference, related art systems may configure extra pilot symbols in time and frequency called interference management resources (IMR) to the UE. During IMR transmission, the desired base station is muted and a subset of the remaining base stations in the CoMP set transmits. The transmission can be explained by the following equation which is the received signal y in a given IMR.

$$y = I + n$$

The received signal may assist the UE in estimating the interference plus noise power (I+n)est. The estimate for the CQI value is $$cqi \approx \log_2\left(1 + \frac{|H_{est} * S|^2}{(I+N)_{est}}\right) \quad (2)$$

The accuracy of the channel estimation tends to increase when the interference decreases. The theoretical ideal channel estimation occurs when only the BS whose downlink channel is to be estimated is the only BS transmitting, with all of the other BS's in the cooperating set muted (silent, not transmitting). However this channel estimation comes at the cost of inadequate interference measurement. For example, in a case where only one BS is transmitting to the UE with the remaining BS's in the cooperating set being muted, the UE can only measure the background noise power. The inadequate interference measurement can lead to inaccurate CQI computation for subsequent data transmissions when the other BS in the cooperating set are actually transmitting.

SUMMARY

Aspects of the example embodiments include a base station, which includes a central processing unit (CPU) that is configured to determine a plurality of channel quality indicator (CQI) values for a coordinated multipoint transmission reception (CoMP) scheme for each user equipment (UE) associated with the base station based on a lower bound CQI value for at least one collaborating base station with respect to the each UE, and an upper bound CQI value for the base station with respect to the each UE, when the base station is serving as a serving base station; and, a front end handling transmissions and receptions between the base station and the each UE.

The base station may be further configured to transmit first instructions for muting ones of the at least one collaborating base station with a higher signal strength than a first one of the at least one collaborating base station with respect to the at least one of the UE; transmit second instructions for instructing remaining ones of the at least one collaborating base station to transmit a pilot signal; and determine a CQI value of the at least one of the UE as the lower bound CQI value for the first one of the at least one collaborating base station with respect to the at least one of the UE, when the base station is serving as the serving base station.

Additional aspects of the example embodiments may further include a non-transitory computer readable medium storing instructions for operating a base station. The instructions may include determining a plurality of channel quality indicator (CQI) values for a coordinated multipoint transmission reception (CoMP) scheme for each user equipment (UE) associated with the base station based on a lower bound CQI value for at least one collaborating base station with respect to the each UE, and an upper bound CQI value for the base station with respect to the each UE, when the base station is serving as a serving base station; and handling transmissions and receptions between the base station and the each UE.

The instructions may further involve transmitting first instructions for muting ones of the at least one collaborating base station with a higher signal strength than a first one of the at least one collaborating base station with respect to the at least one of the UE; transmitting second instructions for instructing remaining ones of the at least one collaborating base station to transmit a pilot signal; and determining a CQI value of the at least one of the UE as the lower bound CQI value for the first one of the at least one collaborating base station with respect to the at least one of the UE, when the base station is serving as the serving base station.

Additional aspects of the example embodiments may further include a system, which involves a serving base station comprising a front end handling transmissions and receptions between the base station and each user equipment (UE) associated with the serving base station, wherein the serving base station is configured to determine a plurality of channel quality indicator (CQI) values for a coordinated multipoint transmission reception (CoMP) scheme for the each UE associated with the base station based on a lower bound CQI value for at least one collaborating base station with respect to the each UE, and an upper bound CQI value for the base station with respect to the each UE, when the base station is serving as a serving base station; and, the at least one collaborating base station. The serving base station may be further configured to transmit first instructions for muting ones of the at least one collaborating base station with a higher signal strength than a first one of the at least one collaborating base station with respect to the at least one of the UE; transmit second instructions for instructing remaining ones of the at least one collaborating base station to transmit a pilot signal; and determine a CQI value of the at least one of the UE as the lower bound CQI value for the first one of the at least one collaborating base station with respect to the at least one of the UE.

BRIEF DESCRIPTION OF THE DRAWINGS

FIG. 2(b) illustrates a configuration of a collaborating base station, in accordance with an example embodiment.

FIG. 6 illustrates a table for CQI values stored in the memory of a BS, in accordance with an example embodiment.

FIG. 7 illustrates a flowchart for a CoMP schedule module in accordance with an example embodiment.

FIG. 8(a) illustrates a flow diagram of a system in accordance with an example embodiment.

FIGS. 9(a) and 9(b) illustrate example resource element schedules for base stations, in accordance with an example embodiment.

DETAILED DESCRIPTION

Figure 1A:
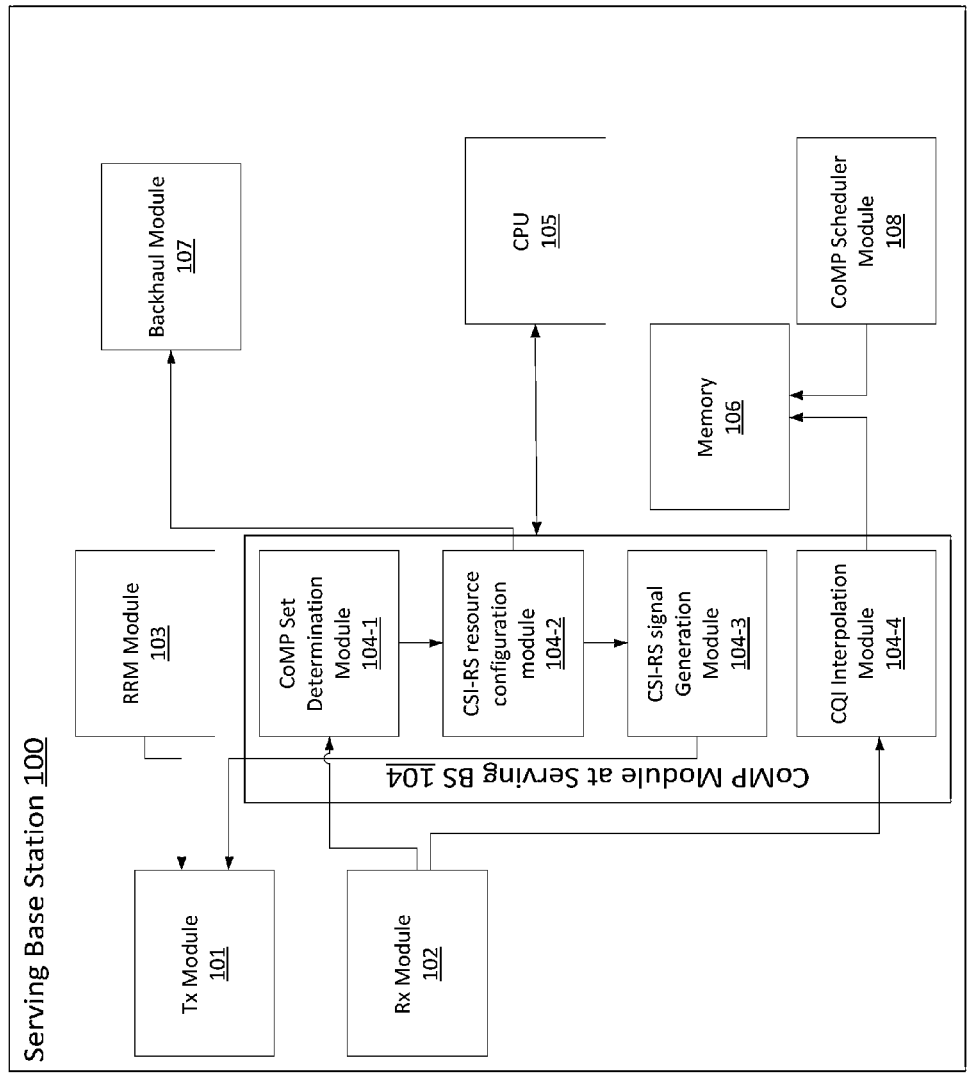
FIG. 1 illustrates a configuration of a serving base station (BS) in accordance with an example embodiment.

Example embodiments are directed to systems and methods by which a group of base stations (BS) can configure pilot signals in time and time-frequency. The pilot signals can include channel state information reference signal (CSI-RS) resources and/or IMR. The pilot signals utilized can be CSI-RS resources only, or can be a combination of CSI-RS and IMR. User equipment (UE) such as mobiles and laptops can measure possible channel quality indicators (CQI) that correspond to specific channel and interference conditions that can arise during actual data submission. Using these values, example embodiments also utilize an interpolation algorithm by which the group of base stations can estimate other possible CQI corresponding to a different set of channel and interference conditions. Example embodiments may be implemented in LTE-Advanced cellular networks involving base station cooperation technology called coordinated multipoint transmission reception (CoMP).

In an example embodiment where the pilot signals involve only CSI-RS, for each UE, the base station may first determine the order of the base stations per their decreasing downlink signal strength to the UE. If there are N BS for each UE, the base station then configures N+1 CSI-RS resources for each UE wherein each UE measures the channel to each of these N BS. In a given resource where a particular downlink channel from a BS is being estimated, a subset of the remaining BS is also configured to transmit to create interference. This is called partial muting. The size of this interfering subset is chosen to be larger for a BS that has a higher signal strength channel to the UE. This size determination may allow the UE to measure interferences arising from these BSs and compute CQI of these transmissions.

In an example embodiment where the pilot signals involve both CSI-RS and IMR, for each UE, the base station may first determine the order of the base stations per their decreasing downlink signal strength to the UE. If there are N BS for each UE, the base station then configures N IMRs and N CSI-RS resources for each UE wherein each UE measures N different channel and interference to each of these N BS. For each IMR, a subset of the remaining BS is also configured to transmit to create interference. The size of this interfering subset is chosen to be larger for a BS that has a higher signal strength channel to the UE. This size determination may allow the UE to measure interferences arising from these BSs and compute CQI of these transmissions.

By utilizing the ordering of the BS based on downlink signal strength, these signal and interference values may also provide bounds when the signaling and interfering BS are different, while keeping the number of signaling and interfering base stations the same. By using these bounds, example embodiments may utilize a method by which the BS can derive or interpolate other CQI values.

The example embodiments may be implemented in LTE-Advanced cellular systems employing CoMP, such as Release 11 (Rel-11) LTE onwards. Implementations of the example embodiments can reduce the feedback overhead needed to implement CoMP and can lead to flexibility in implementing a multitude of CoMP schemes.

Note that if there are N base stations in the cooperating set, any one or more of these N base stations can transmit to the UE during actual data transmission. The states of each base station could also change with time. Thus the UE may need to identify all possible kinds of CQI values that correspond to different combinations of signaling and interfering base stations. However, the total number of such possible combinations is large and is exponential with N. The network may not be able to configure so many pilot resources (IMR and CSI-RS resources, or CSI-RS resources only). The example embodiments are thereby directed to permitting the network to configure only N resources (N CSI-RS and N corresponding IMR, or only N CSI-RS) from which the UE can measure N+1 CQIs and from which other CQIs can also be estimated by the network.

There are two kinds of BSs in the CoMP set. There is the serving BS to which the UE connects initially, and to which the UE has the highest value of downlink received signal strength. There are also the other BS in the CoMP set that collaborate with the serving BS to transmit to the UE. The UE communicates mainly with the serving BS. The serving BS is responsible for the CoMP functionality (e.g., determining which other BS should collaborate in CoMP based on UE feedback, how to configure CSI-RS resources for channel estimation) and forwards information to the UE via downlink control signaling and to the other BS via a backhaul.

FIG. 1(a) illustrates a configuration of a serving base station (BS) in accordance with an example embodiment. BS within in a system in accordance with the example embodiments may utilize modules in accordance with the configuration of FIG. 1(a), when the base stations are serving as a serving BS. In the example depicted in FIG. 1(a), channel estimation is conducted by sending CSI-RS only.

Figure 11:
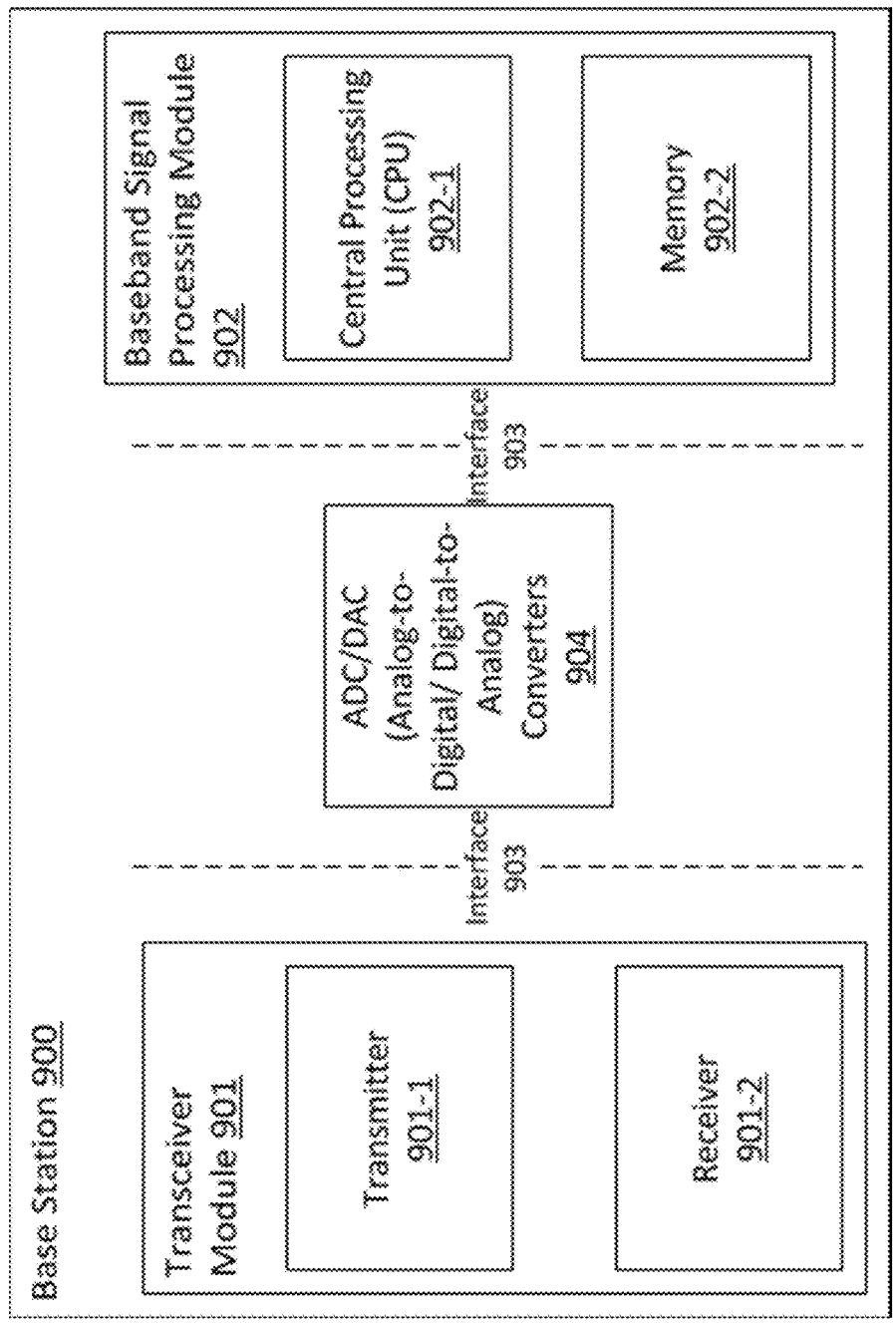
FIG. 11 illustrates a hardware configuration of the base station, in accordance with an example embodiment.

The serving BS 100 may involve a transceiver (Tx) 101 and a receiver (Rx) 102 module for transmitting to the UE and receiving the signals from the UE and a backhaul module 107 for communicating with other BS. Tx 101 and Rx 102 modules may be implemented in a hardware configuration, such as a radio frequency (R/F) front end as shown in FIG. 11. The serving BS 100 has a radio resource management (RRM) module 103 for generating signals utilizing RRM measurement which determines the link gain (path loss, shadowing etc.) of each BS to the UE. The serving BS 100 has a CoMP module 104 for CoMP functionality, a CPU 105 for implementing digital signal processing of the LTE signal as well as being configured to execute the sub-modules of the CoMP module 104, and a memory 106 that supports the modules of the serving BS 100. The serving BS 100 may also include a backhaul module 107 for communicating with other base stations via a backhaul. The serving BS module 100 may further utilize a CoMP scheduler module 108, for jointly performing scheduling with all BS in the CoMP set. Further details about the CoMP scheduler module 108 are provided in the description for FIG. 7.

The CoMP module 104 of the serving BS 100 may further include the following additional sub-modules:

The CoMP set determination module 104-1 determines whether other BS should be in the CoMP set of a given UE based on the reported RRM measurement values from the UE. The CoMP set determination module 104-1 may also rank the serving BS 100 itself as well as the collaborating BS in decreasing order of signal strengths to the UE.

The CSI-RS resource configuration module 104-2 determines, for all BS in the CoMP set, which REs the BS should transmit pilot signals or mute their transmission, and with what corresponding power level. Further details about the CSI-RS configuration resource configuration module are provided in the description for FIG. 3.

The CSI-RS resource generation module 104-3 generates the CSI-RS pilot signals for the serving BS.

The CQI interpolation module 104-4 receives CQI values reported by the UE and interpolates the CQI for other configurations (corresponding to different signaling and interfering BS). Further details about the CQI interpolation module are provided in the description for FIG. 5.

Figure 1B:
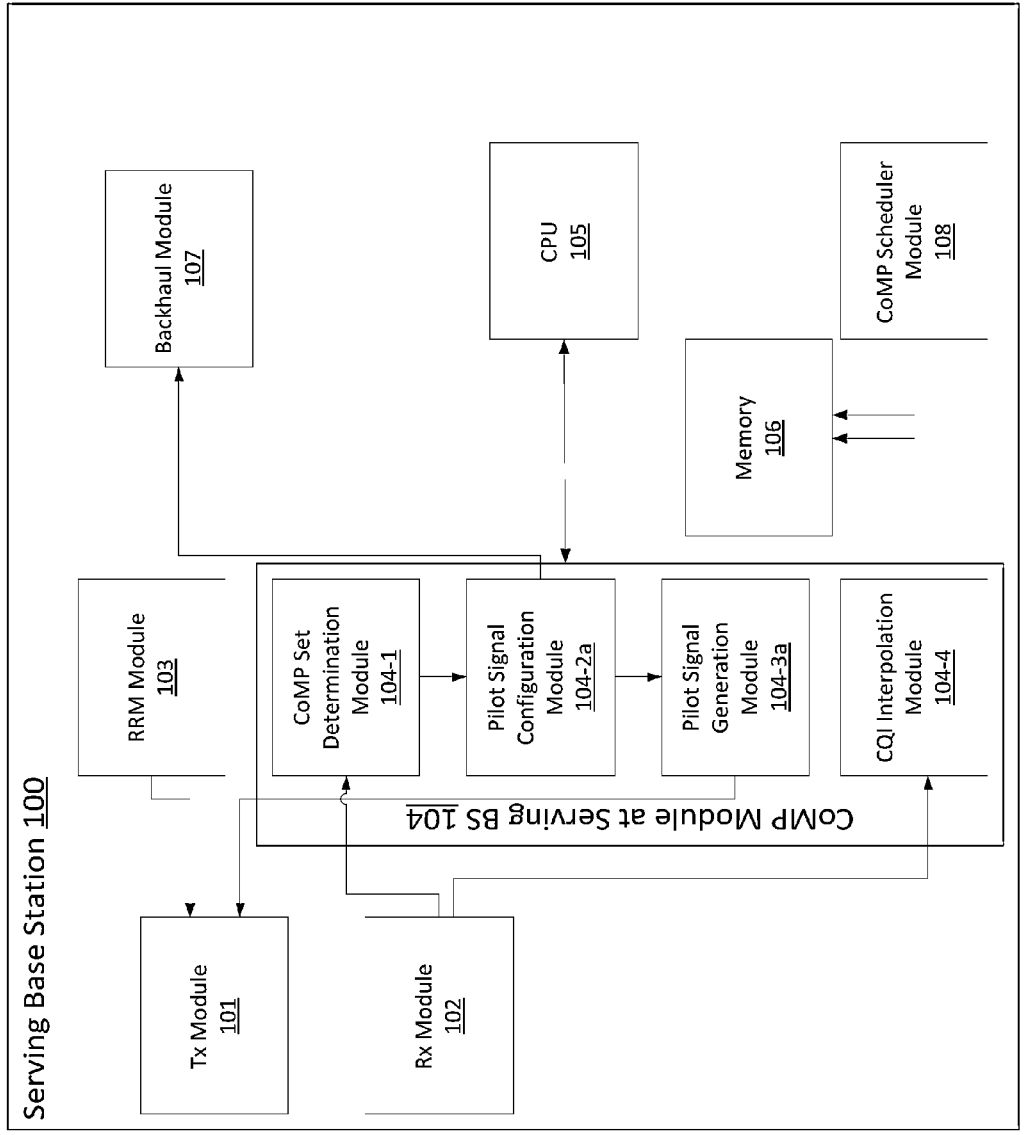

FIG. 1(b) illustrates a configuration of a serving base station (BS) in accordance with an example embodiment. BS within in a system in accordance with the example embodiments may utilize modules in accordance with the configuration of FIG. 1(b), when the base stations are serving as a serving BS. In the example of FIG. 1(b), channel estimation is done using a combination of CSI-RS and IMR. The description of similar elements in FIG. 1(a) are omitted for clarity.

The pilot resource configuration module 104-2a determines, for all BS in the CoMP set, which REs the BS should transmit pilot signals or mute their transmission, and with what corresponding power level. The pilot signal refers to IMR for interference measurements and CSI-RS for channel estimation, or CSI-RS for both interference and channel estimation. Further details about the pilot configuration resource configuration module are provided in the description for FIG. 3(b)-3(d).

The pilot resource generation module 104-3a generates the CSI-RS and IMR signals (or CSI-RS only) for the serving BS.

Figure 2A:
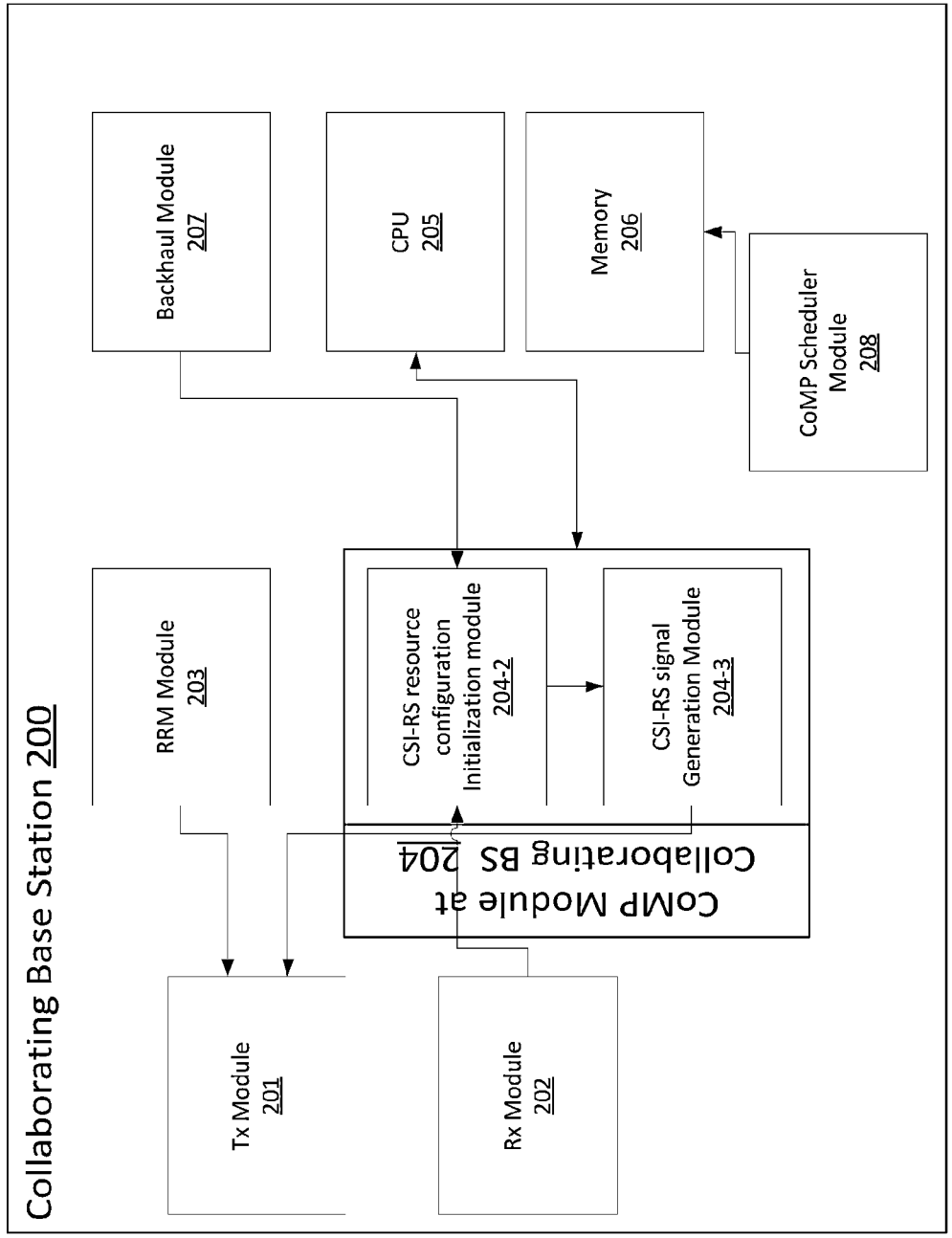
FIG. 2(a) illustrates a configuration of a collaborating base station, in accordance with an example embodiment.

FIG. 2(a) illustrates a configuration of a collaborating base station 200, in accordance with an example embodiment. BS in a system in accordance with the example embodiments may utilize modules with the configuration of FIG. 2(a), when the BS are serving as a collaborating BS. In the example depicted in FIG. 2(a), channel estimation is conducted by only using CSI-RS.

Because a BS may serve as either a serving BS 100 or a collaborating BS 200 at any given time, redundant elements and descriptions thereof are omitted for clarity. The BS in the CoMP set that are not serving as the serving BS (hence called a collaborating BS) may utilize a configuration as shown in FIG. 2(a). As a collaborating base station 200, modules specific to the serving BS 100 such as CoMP set determination 104-1 and CSI-RS configuration modules 104-2 are not utilized, and are omitted for clarity. The CoMP module 204 at the collaborating base station 200 may utilize a CSI-RS resource configuration initialization module 204-2 for initializing the CSI-RS resource configuration based on the CSI-RS configurations reported by the serving BS.

The UE receives RRM signals from all BS in its CoMP set and performs RRM measurements, on which the serving BS ranks all the BS in terms of decreasing signal strength. Based on the CSI-RS pilot signals that are transmitted by all the BS, the UE calculates the signal and interference values, calculates the CQI, and reports the calculated CQI back to the serving BS.

FIG. 2(b) illustrates a configuration of a collaborating base station 200, in accordance with an example embodiment. BS in a system in accordance with the example embodiments may utilize modules with the configuration of FIG. 2(b), when the BS are serving as a collaborating BS. Because a BS may serve as either a serving BS 100 or a collaborating BS 200 at any given time, redundant elements and descriptions thereof are omitted for clarity.

In the example depicted in FIG. 2(b), channel estimation is conducted by using a combination of CSI-RS and IMR in the pilot signal. Thus, the CSI-RS resource configuration module 204-2 is replaced by a pilot signal configuration initialization module 204-2 for initializing the pilot signal configuration based on the pilot configurations reported by the serving BS.

Figure 3A:
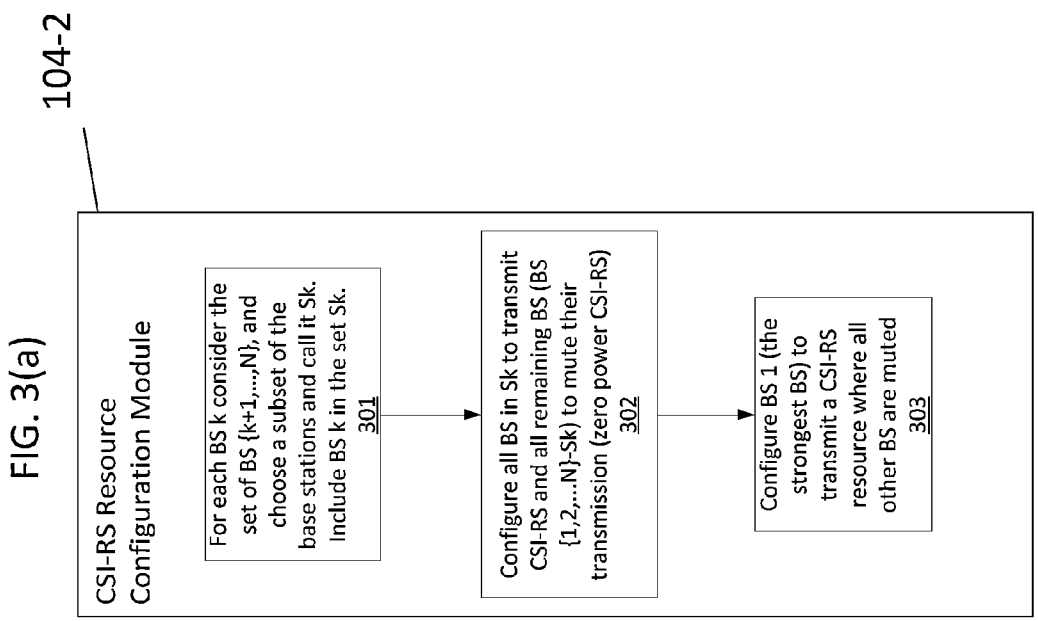
FIG. 3(a) illustrate a flowchart for the CSI-RS resource configuration module, in accordance with an example embodiment.

FIG. 3(a) illustrates a flowchart for the CSI-RS resource configuration module 104-2, in accordance with an example embodiment. For each transmitting BS, the set of interfering BS may need to be determined. As mentioned above, a stronger channel quality may tolerate higher interference and still provide a good estimate for the channel with respect to interference.

As disclosed above, the serving BS 100 orders the BS by decreasing signal strength, in a CoMP set of N BSs. Thus, if BS k is the transmitting BS, then BS 1 to k−1 have stronger signals to the UE and are muted, as otherwise the transmission of such BSs' might cause interference stronger than the desired signal. This can be assumed for data transmission and hence also used in the CSI-RS process.

BSs k+1 to N have weaker signal strengths with respect to the BS and may be included in the interference terms. A subset of these BS will transmit. At 301, the CSI-RS resource configuration module 104-2 determines the subset. The set of transmitting BS where BS k is the BS carrying signal is denoted as Sk. Then the remaining BS i.e. $\{1, \ldots N\}$-Sk do not transmit (are muted).

The flow at 301 and 302 is iterated for each BS until each of the N BS is configured. After these N CSI-RS resources are configured (corresponding to each of the N BS) the network also configures another CSI-RS resource where only BS 1 (the strongest BS and the serving BS) transmits and all others are muted, as shown at 303. The transmission of BS 1 serves as the upper bound for all achievable throughputs for all other combinations of signaling and interfering BS, wherein CQI values for various subsets are interpolated based on the upper bound.

Figure 3D:
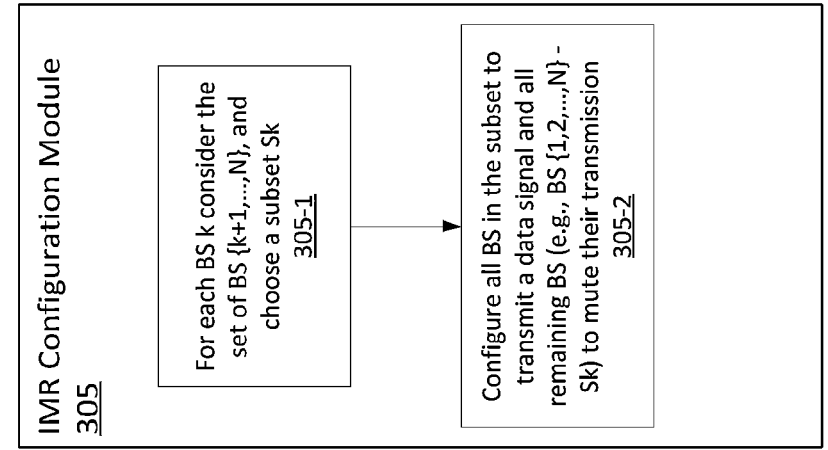
FIGS. 3(b) to 3(d) illustrate a flowchart for the pilot resource configuration module, in accordance with an example embodiment.
Figure 3C:
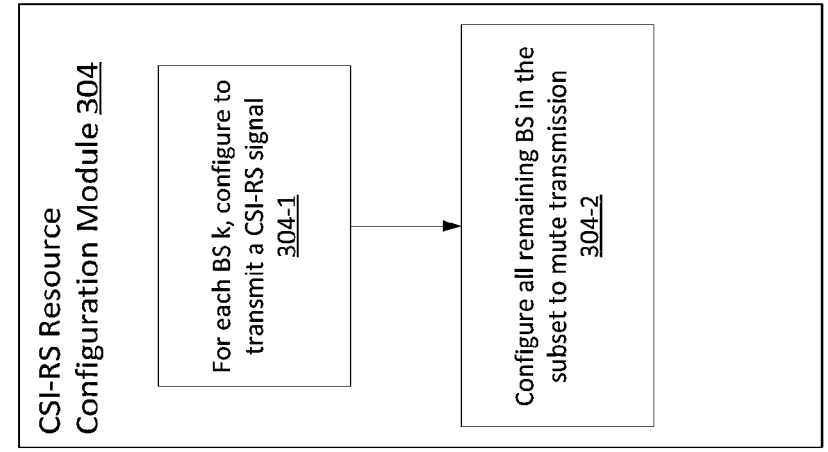
Figure 3B:
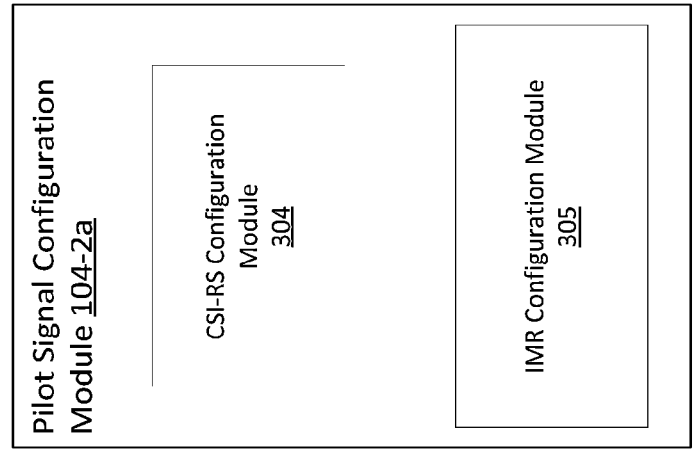

FIGS. 3(b) to 3(d) illustrate a flowchart for the pilot signal resource configuration module 104-2a, in accordance with an example embodiment. FIG. 3(b) illustrates that the pilot signal resource configuration module 104-2a may invoke a CSI-RS configuration module 304 and a IMR configuration module 305.

FIG. 3(c) illustrates the CSI-RS configuration module 304 that can be invoked by a pilot signal configuration module 104-2a. At 304-1, for each BS k, the CSI-RS configuration module is configured to send instructions to transmit a CSI-RS signal. At 304-2, the CSI-RS configuration module is configured to send instructions to mute remaining BS in the CoMP set to provide a channel estimation of BS k.

As in the case of FIG. 3(a), for each transmitting BS, the set of interfering BS may need to be determined. As mentioned above, a stronger channel quality may tolerate higher interference and still provide a good estimate for the channel with respect to interference.

As in the case of FIG. 3(a), the serving BS 100 orders the BS by decreasing signal strength, in a CoMP set of N BSs. Thus, if BS k is the transmitting BS, then BS 1 to k−1 have stronger signals to the UE and are muted, as otherwise the transmission of such BSs' might cause interference stronger than the desired signal. This can be assumed for data transmission and hence also used when using both IMR and CSI-RS resources for channel estimation.

BSs k+1 to N have weaker signal strengths with respect to the BS and may be included in the interference terms. A subset of these BS will transmit.

FIG. 3(d) illustrates the IMR configuration module 306 that can be invoked by a pilot signal configuration module 104-2a. In an example embodiment where the pilot signal can be both CSI-RS and IMR, at 305-1, the IMR configuration module determines the subset. The set of transmitting BS where BS k is the BS carrying signal is denoted as Sk. Then the remaining BS i.e. $\{1, \ldots N\}$-Sk do not transmit (are muted) at 305-2. The muted BS also includes the serving BS k so that the UE can directly measure the interference. Thus, the last IMR is configured so that all the BS in the CoMP set are muted, which allows the UE to measure interference and noise originating from outside the CoMP set.

Thus N CSI-RS resources are configured corresponding to each of the N BS and the UE measures the channel for each of them. N IMRs are also configured with each IMR associated with a CSI-RS transmission so that the UE can measure a corresponding interference. From these measurements, the UE can determine N+1 CQI values which can be reported back to the serving BS.

Figure 4A:
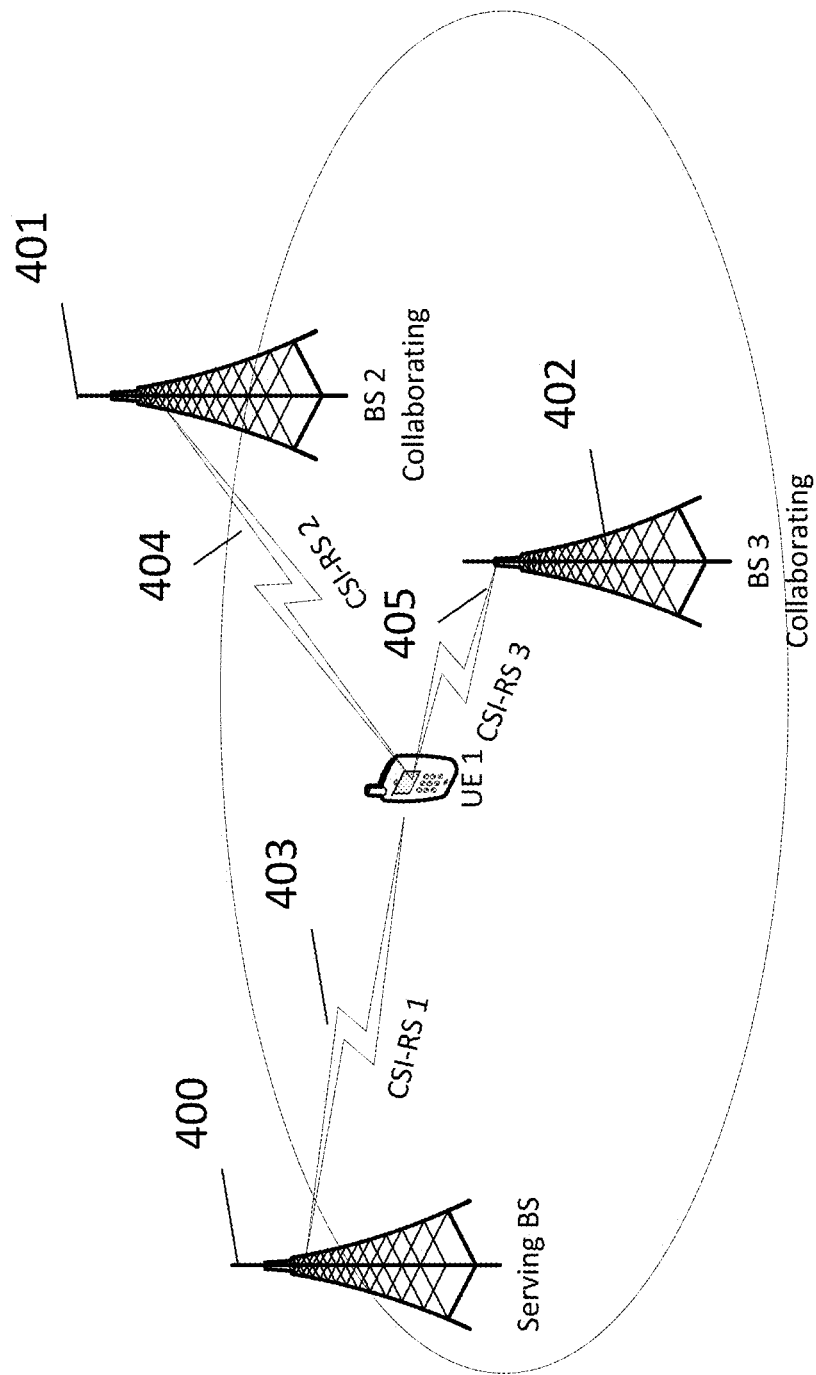
FIG. 4(a) illustrates an example network configuration for illustrating the flowchart of FIG. 3(a), in accordance with an example embodiment.

FIG. 4(a) illustrates an example network configuration for illustrating the flowchart of FIG. 3(a), in accordance with an example embodiment.

In an example of the flowchart for FIG. 3(a), assume that there are N=3 BS in the CoMP set, with one serving BS 400 (referred herein as BS 1) and two collaborating BSs 401 and 402 (referred herein as BS 2 and BS 3, respectively). The example network configuration is shown in FIG. 4(a).

Thus, the order of the BS in terms of decreasing signal strength to UE is {BS 1, BS 2, BS 3}. When BS 1 transmits CSI-RS 1 403, BS 1 acts as the signal and BS 2 and BS 3 act as interference. When BS 2 transmits 404, only BS 3 acts as interference and BS 1 is muted. When BS 3 transmits 405, BS 1 and 2 are muted. Thus set S1={BS 1, BS 2, BS 3}, set S2={BS 2, BS 3} and set S3={BS 3}. In set Sk, BS k is the BS with signal and remaining are interferers. Thus the serving BS 1 configures BS 2 and BS 3 to transmit CSI-RS. The received signal by the UE in the 3 CSI-RS resources are $$y_1 = H_1 s_1 + I_2 + I_3 + z$$

$$y_2 = H_2 s_2 + I_3 + Z$$

$$y_3 = H_3 s_3 + z \tag{3a}$$

Figure 4B:
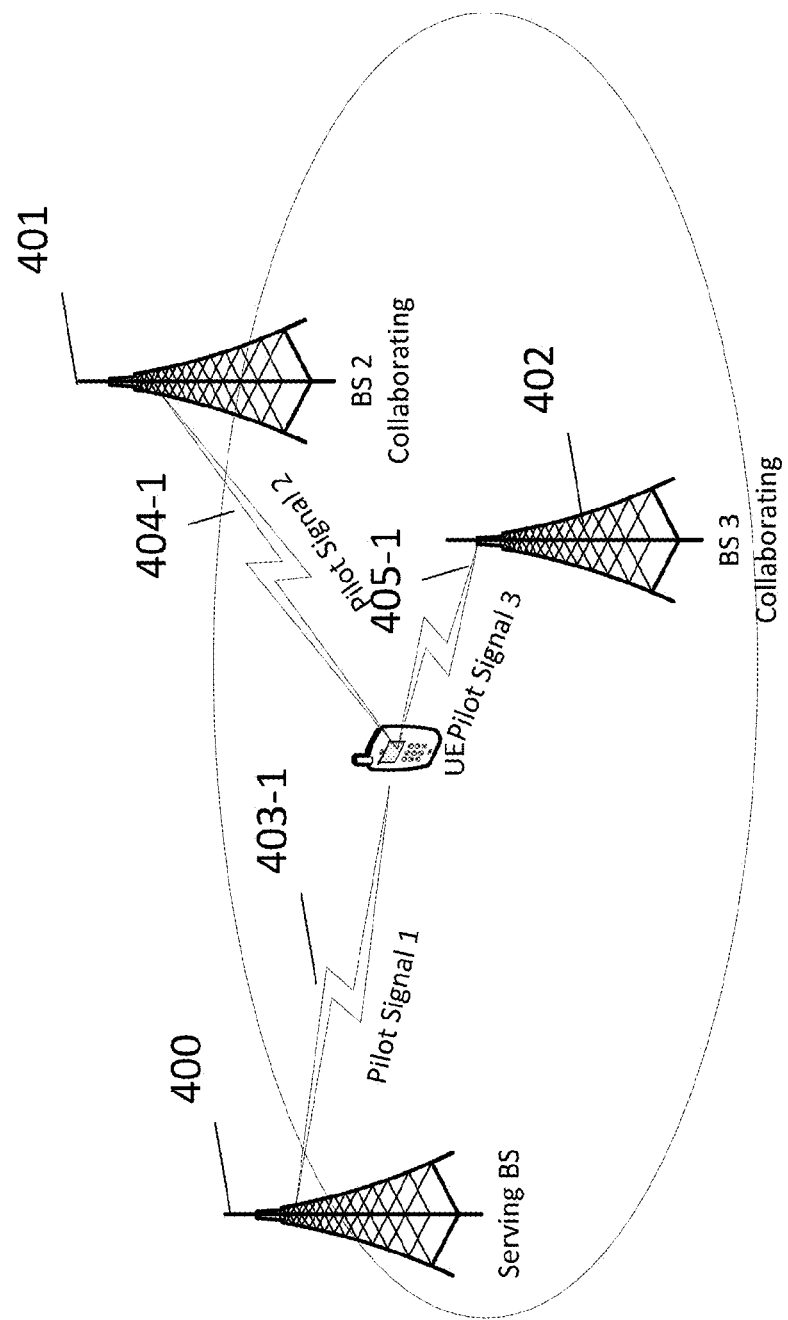
FIG. 4(b) illustrates an example network configuration for illustrating the flowchart of FIGS. 3(b) to 3(d), in accordance with an example embodiment.

FIG. 4(b) illustrates an example network configuration for illustrating the flowchart of FIG. 3(b)-(d), in accordance with an example embodiment.

The example is the same as that of FIG. 4(a) with the exception of the transmission of pilot signals 403-1. 404-1 and 405-1 instead of CSI-RS.

The serving BS 1 configures BS 2 and BS 3 to transmit CSI-RS. When BS 1 transmits CSI-RS k, the other BS are muted. The network configures N=3 CSI-RS signals as follows:

$$y_{CSI-RS-1} = H_1 s_1 + z$$

$$y_{CSI-RS-2} = H_2 s_2 + z$$

$$y_{CSI-RS-3} = H_3 s_3 + z \tag{3b}$$

This enables the UE to estimate the channels for BS 1, BS 2 and BS 3. Now the network configures N=3 IMRs. During actual data transmission, when BS 1 transmits 403-1 the data signal, BS 2 and BS 3 can act as interference. When BS 2 transmits 404-1 only BS 3 acts as interference and BS 1 is muted. When BS 3 transmits 405-1, BS 1 and 2 are muted. Thus set S1={BS 2, BS 3}, set S2={BS 3} and set S3={Null}. The received signal by the UE in the 3 IMRs are $$y_{IMR-1} = I_2 + I_3 + z$$

$$y_{IMR-2} = I_3 + z$$

$$y_{IMR-3} = z \tag{3c}$$

with N be the measured power of z (e.g. interference and noise originating from outside the CoMP set).

With the help of the above calculations (either from formula 3(a) or from formulas 3(b) and 3(c)), the UE can determine the following CQIs $$c_1 \approx \log_2\left(1 + \frac{|H_1 * S_1|^2}{I_2 + I_3 + N}\right) \quad (4)$$

$$c_2 \approx \log_2\left(1 + \frac{|H_2 * S_2|^2}{I_3 + N}\right)$$

$$c_3 \approx \log_2\left(1 + \frac{|H_3 * S_3|^2}{N}\right)$$

The UE is configured to report another CQI corresponding to the situation where the serving BS 1 transmits and all BS within CoMP set are muted. This will give an upper bound to achievable CQI by the UE (as BS 1 has the strongest signal and this CQI computation assumes no interference from other CoMP set BSs). In the examples of FIGS. 4(*a*) and 4(*b*), the serving BS 400, BS 1 also configures another CSI-RS resource where only BS 1 transmits, and the corresponding CQI calculated by the UE is $$c_{max} \approx \log_2\left(1 + \frac{|H_1 * S_1|^2}{N}\right) \quad (5)$$

From the above formula set (4) and from formula (5), the CQI can be interpolated for other base station configurations (e.g., BS 2 transmits with BS 3 muted, etc.), based on a weighting. The weight may be adjusted, or a weighing system may be created by one of ordinary skill in the art to obtain a desired accurate level of estimation for a CQI value based on the system configuration.

Figure 5:
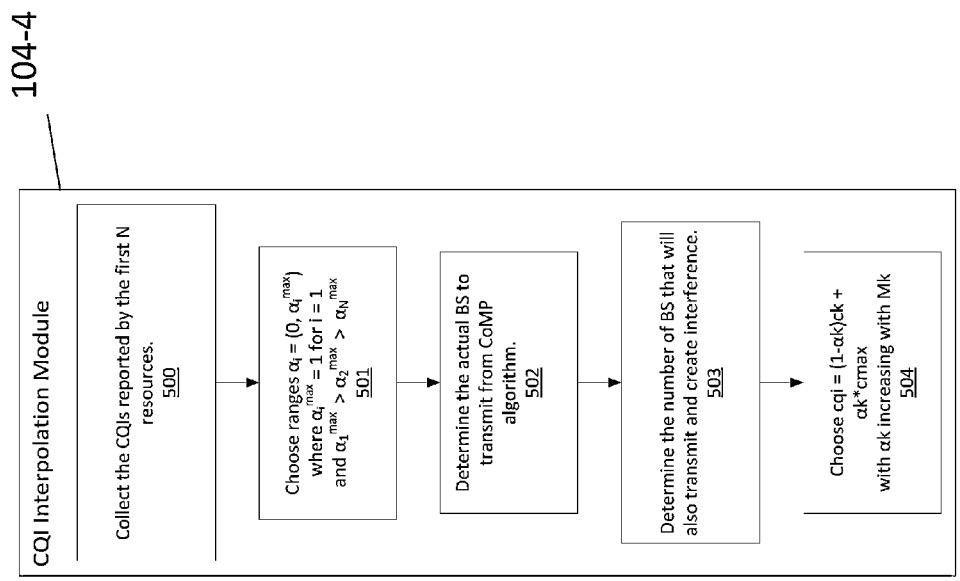
FIG. 5 illustrates a flowchart for the CQI interpolation module, in accordance with an example embodiment.

FIG. 5 illustrates a flowchart for the CQI interpolation module 104-4, in accordance with an example embodiment. The CQI interpolation module 104-4 performs the CQI interpolation at the serving base station. When BS 1 is transmitting, there are 2 CQIs (c1 and cmax) and for all other BS k transmitting there is one (ck). The CSI-RS transmission is used for channel estimation, as noted above. However, several situations can occur during an actual data transmission, as described below.

When BS k is transmitting, any of the remaining k+1 to N BS may also transmit and act as interference. Thus, the CQI value may not necessarily be based on the set {Sk}-k as had been the case during CSI-RS or pilot signal transmission. For example, during actual transmission, BS 1 might be transmitting and BS 2 may be muted, leading to the following supported rate:

$$c_{req} \approx \log_2\left(1 + \frac{|H_1 * S_1|^2}{I_3 + N}\right) \quad (6)$$

This CQI has to be predicted from c1, c2, c3, and cmax. However, it can be assumed that BS 1 to k−1 is muted during data transmission of BS k as otherwise strong interference would be created.

As shown by the flowchart of FIG. 5, at 500, the reported CQIs by the first N resources are collected. Denote these CQIs as c1, c2, . . . , cN. The CQI reported by the last resource (where only BS 1, or the serving base station is transmitting), is denoted as cmax.

At 501, the ranges $\alpha i$ are chosen to interpolate CQI values based on the reported CQI values, such that $\alpha i=(0, \alpha i max)$, where $\alpha i max=1$ for i=1, and $\alpha 1 max > \alpha 2 max > \ldots > \alpha N max$. $\alpha i$ reflects a weight for interpolating CQI values of various base station configurations based on received values. Higher potential interference would imply a lower CQI, which would result in selecting a lower weight value. A higher weight value implies that less interference is present, thereby resulting in a higher CQI. The weights may be determined by any method of one of ordinary skill in the art based on the reported CQI values and the system configuration to obtain a good enough estimate. In the example provided, the $\alpha i max$ are derived based on the reported CQI values of c1, c2, c3, . . . cmax, and various values of $\alpha i$ are then derived to interpolate the various CQI values.

At 502, the transmitting BS is determined and set as BS k. The parameter $\alpha k max$ for BS k is determined with $\alpha 1 max=1$ and $\alpha 1 max > \alpha 2 max > \ldots > \alpha N max$.

At 503, for any BS k, the CQI interpolation module decides the number of BS to transmit and create interference. Let this number be Nk, and chose $\alpha k=(0, \alpha k max)$ such that $\alpha k$ is lower for higher Nk. (or higher for higher Mk=|Sk|−Nk).

At 504, the CQI interpolation module interpolates various CQI values as $(1-\alpha k)c_k + \alpha k * c_{max}$, with $\alpha k$ increasing with Mk, based on the derived $\alpha i$ values as described above.

As an example, suppose k=1 and only BS 3 is transmitting, which renders Nk=1. Thus the CQI is going to be closer to the upper bound (cmax) than the case when both BS 2 and BS 3 are transmitting (i.e., c1).

In an additional example, suppose the determination is changed to BS 2 and assume BS 3 is not transmitting. The CQI that BS 2 can achieve is still upper bounded by cmax but may not equal cmax, because H1 has highest channel power value, which is higher than H2. Hence in the formula for CQI interpolation $\alpha 2 max < 1$.

FIG. 6 illustrates a table for CQI values stored in the memory of a BS, in accordance with an example embodiment. The BSs maintain tables in their memory modules as shown in FIG. 6. These tables store different values of CQI. Some of these values may be reported by the UE (e.g., such as c1, c2, c3, cmax) while others may be interpolated by the CQI interpolation submodule as explained in FIG. 5. These tables are subsequently accessed by the CoMP scheduler module.

FIG. 7 illustrates a flowchart for a CoMP schedule module 108 in accordance with an example embodiment.

In the CoMP scheduler module 108, the different BSs perform joint CoMP scheduling. Thus the CoMP scheduler module 108 is present in all BS—serving and collaborating. At 700 and 701, the scheduler reads different CQI values from the tables mentioned in FIG. 6, along with values of average rates of all UEs. The schedule may read these values in any order, and is not limited to the example of FIG. 7.

At 702, the scheduler derives new CQI values for other CoMP schemes. The scheduler may traverse all available CoMP schemes or a subset of them to reduce complexity. At 703, the scheduler calculates the proportional fair (PF) metric for all UEs that are used for scheduling. For example, if a MU-MIMO or a JT-CoMP scheme is desired, then the scheduler modifies the CQI values in the memory table (FIG. 6) to reflect the effects of the signal processing. This is jointly done at each BS for all of the UEs. At 704, the schedule selects a subset of UEs for scheduling and a CoMP scheme per a scheduling criterion (e.g., PF or PF plus greedy, etc.)

Figure 8B:
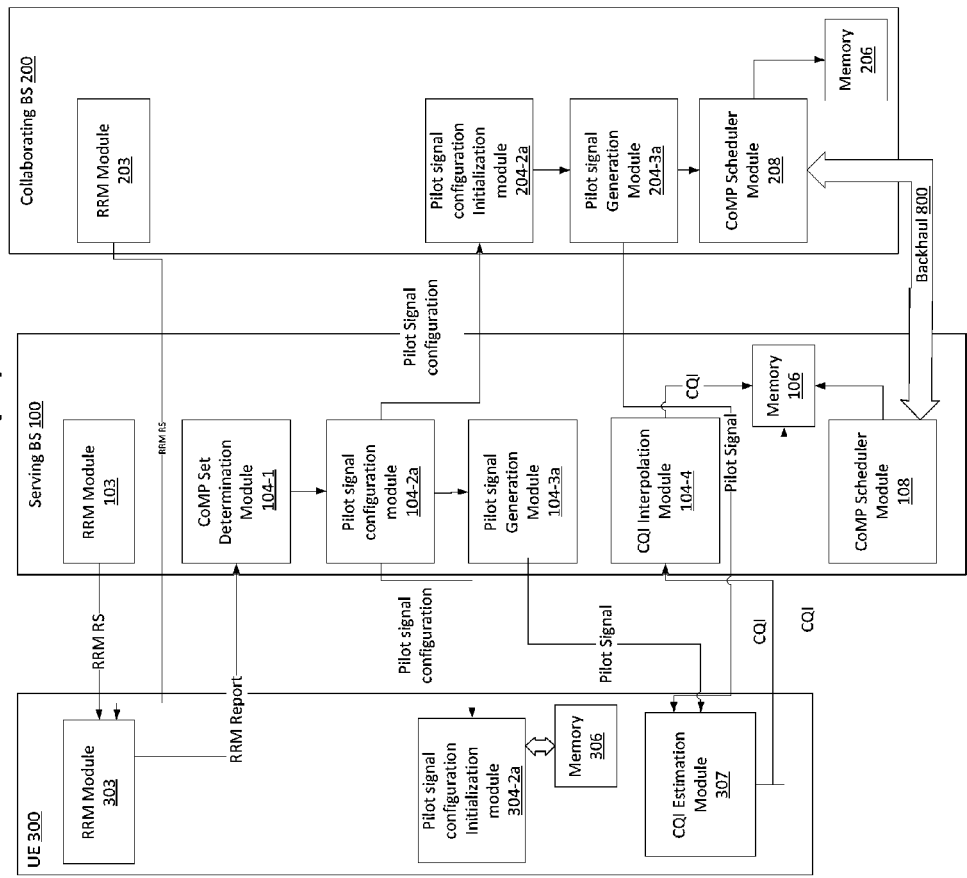
FIG. 8(b) illustrates a flow diagram of a system in accordance with an example embodiment.

FIG. 8(*a*) illustrates a system diagram in accordance with an example embodiment. In the example provided in FIG. 8, a serving BS 100 interacts with a collaborating BS 200 and a UE 300. The configuration in FIG. 8 is exemplary and the example embodiments are not limited to the configuration depicted in FIG. 8. One skilled in the art will recognize that the serving BS may serve multiple UEs, and there may be multiple collaborating BS as well as other BS in the system.

The UE 300 may utilize an RRM module 303, a CSI-RS resource configuration initialization module 304-2, a memory 306 and a CQI estimation module 307.

RRM module 303 processes radio resource management reference signals (RRM-RS) from the serving base station 100, the collaborating base station 200, and possibly other base stations to assist in determining the link gain (e.g., path loss, shadowing etc.) of each BS to the UE. RRM module 303 may respond to the serving base station with an RRM report, which is processed by the CoMP set determination module 104-1 of the serving base station 100. As described in FIG. 1, the CoMP set determination module 104-1 determines which base station(s) should be in the CoMP set of a given UE based on the reported RRM measurement values report from the UE. Based on the determined CoMP set, the CSI-RS resource configuration module 104-2 determines, for all BS in the CoMP set, which REs the BS should transmit pilot signals or mute their transmission, and with what corresponding power level, as depicted in the flowchart of FIG. 3(*a*). Information regarding the configuration determined by the CSI-RS resource configuration module is then transmitted to the UE 300 and the collaborating BS 200, to be processed by CSI-RS resource configuration initialization modules 304-2, 204-2.

The serving BS 100 transmits a CSI-RS from the CSI-RS signal generation module 104-3, to UEs associated with the serving BS 100. UE 300 processes the received CSI-RS and estimates the CQI to the serving BS 100 based on the received CSI-RS by a CQI estimation module 307. The UE 300 may also estimate the CQI from received CSI-RS from other base stations, such as the collaborating BS 200. The UE 300 then forwards a report of the estimated CQI values to the serving BS 100, which stores the values into memory 106. Based on the received values, the serving BS 100 utilizes a CQI interpolation module 104-4 to interpolate CQI values for configurations that were not provided by the UE report and stores them into memory, as depicted in the flowchart of FIG. 5. Based on the interpolated and stored CQI values, the serving BS determines a CoMP scheme and a schedule with the CoMP scheduler module 108, which it may transmit to other BS (e.g., collaborating BS 200) by a backhaul 800.

FIG. 8(*b*) illustrates a system diagram in accordance with an example embodiment. The example of FIG. 8(*b*) is the same as FIG. 8(*a*) with modules configured for pilot signal transmission rather than CSI-RS only transmission. In the example provided in FIG. 8(*b*), a serving BS 100 interacts with a collaborating BS 200 and a UE 300. The configuration in FIG. 8(*b*) is exemplary and the example embodiments are not limited to the configuration depicted in FIG. 8(*b*). One skilled in the art will recognize that the serving BS may serve multiple UEs, and there may be multiple collaborating BS as well as other BS in the system.

The UE 300 may utilize an RRM module 303, a pilot signal configuration initialization module 304-2*a*, a memory 306 and a CQI estimation module 307.

RRM module 303 processes radio resource management reference signals (RRM-RS) from the serving base station 100, the collaborating base station 200, and possibly other base stations to assist in determining the link gain (e.g., path loss, shadowing etc.) of each BS to the UE. RRM module 303 may respond to the serving base station with an RRM report, which is processed by the CoMP set determination module 104-1 of the serving base station 100. As described in FIG. 1(*b*), the CoMP set determination module 104-1 determines which base station(s) should be in the CoMP set of a given UE based on the reported RRM measurement values report from the UE. Based on the determined CoMP set, the pilot signal configuration module 104-2 determines, for all BS in the CoMP set, which REs the BS should transmit pilot signals or mute their transmission, and with what corresponding power level, as depicted in the flowchart of FIG. 3(*b*)-(*d*). Information regarding the configuration determined by the pilot signal configuration module is then transmitted to the UE 300 and the collaborating BS 200, to be processed by pilot signal configuration initialization modules 304-2*a*, 204-2*a*.

The serving BS 100 transmits a pilot signal from the pilot signal generation module 104-3*a*, to UEs associated with the serving BS 100. UE 300 processes the received pilot signal and estimates the CQI to the serving BS 100 based on the received pilot signal by a CQI estimation module 307. The UE 300 may also estimate the CQI from received pilot signal from other base stations, such as the collaborating BS 200. The UE 300 then forwards a report of the estimated CQI values to the serving BS 100, which stores the values into memory 106. Based on the received values, the serving BS 100 utilizes a CQI interpolation module 104-4 to interpolate CQI values for configurations that were not provided by the UE report and stores them into memory, as depicted in the flowchart of FIG. 5. Based on the interpolated and stored CQI values, the serving BS determines a CoMP scheme and a schedule with the CoMP scheduler module 108, which it may transmit to other BS (e.g., collaborating BS 200) by a backhaul 800.

FIG. 9(*a*) illustrates an example implementation of a resource element schedule with respect to a transmission of a pilot signal (CSI-RS only as noted in FIGS. 1(*a*), 3(*a*), and 4(*a*)), in accordance with an example embodiment. Referring to FIG. 4(*a*), when BS 1 transmits CSI-RS 1, BS 1 is treated as the signal and BS 2 and BS 3 act as interference. When BS 2 transmits, BS 2 is treated as the signal, BS 3 acts as interference and BS 1 is muted. When BS 3 transmits, BS 1 and 2 are muted. From this example, set S1={BS 1, BS 2, BS 3}, set S2={BS 2, BS 3} and set S3={BS 3}. In set Sk, BS k is the BS with signal and the remaining BS are interferers. The serving BS 1 configures BS 2 and BS 3 to transmit CSI-RS according to a resource element schedule with respect to frequency and time, an example of which is shown in FIG. 9(*a*). The schedule may instruct the BS to transmit data at certain resource elements and CSI-RS at other resource elements. The received signal by the UE in the 3 CSI-RS resources are $$y_1^a = H_1 s_{CSI\text{-}RS\text{-}1} + H_2 s_{CSI\text{-}RS\text{-}2} + H_3 s_{CSI\text{-}RS\text{-}3} + z$$

$$y_2^a = H_2 s_{CSI\text{-}RS\text{-}2} + H_3 s_{CSI\text{-}RS\text{-}3} + z$$

$$y_3^a = H_3 s_{CSI\text{-}RS\text{-}3} + z$$

With the help of the received signals, the UE may then estimate the channels $$\hat{H}_1^a = f(y_1^a)$$

$$\hat{H}_2^a = f(y_2^a)$$

$$\hat{H}_3^a = f(y_3^a)$$

Errors in channel estimation can arise due to the interfering CSI-RS signals from other base stations. From these values the UE estimates the following interference measurements $$\hat{I}_1^a = y_1 - \hat{H}_1^a s_{CSI\text{-}RS\text{-}1}$$

$$\hat{I}_2^a = y_2 - \hat{H}_2^a s_{CSI\text{-}RS\text{-}2}$$

$$\hat{I}_3^a = y_3 - \hat{H}_3^a s_{CSI\text{-}RS\text{-}3}$$

The interference estimated may be due to the other BS transmitting CSI-RS signals, which may be different from interference caused due to data transmission. Hence there may be inaccuracies in estimating interference from using CSI-RS, although the signaling overhead of utilizing CSI-RS alone may be lower than the signaling overhead of a combination of CSI-RS and IMR. From these values the UE estimates the following CQIs, $$c_1^a \approx \log_2\left(1 + \frac{|\hat{H}_1^a s_1|^2}{\hat{I}_1^a}\right)$$

$$c_2^a \approx \log_2\left(1 + \frac{|\hat{H}_2^a s_2|^2}{\hat{I}_2^a}\right)$$

$$c_3^a \approx \log_2\left(1 + \frac{|\hat{H}_3^a s_3|^2}{\hat{I}_3^a}\right)$$

FIG. 9(b) illustrates an example implementation of a resource element schedule with respect to a transmission of a pilot signal (CSI-RS or IMR as noted in FIGS. 1(b), 3(b)-(d) and 4(b)), in accordance with an example embodiment. Referring to the example of FIG. 4(b), when BS k transmits CSI-RS k, the others are muted. From the example of FIG. 4(b), the network configures N=3 CSI-RS signals as follows $$y_1^b = H_1 s_{CSI-RS-1} + z$$

$$y_2^b = H_2 s_{CSI-RS-2} + z$$

$$y_3^b = H_3 s_{CSI-RS-3} + z$$

From the received signals, the UE to estimate the channels $H_1$, $H_2$ and $H_3$.

$$\hat{H}_1^b = f(y_1^b)$$

$$\hat{H}_2^b = f(y_2^b)$$

$$\hat{H}_3^b = f(y_3^b)$$

The estimation of the channels may be better than utilizing only CSI-RS as shown in the example of FIG. 9(a), however, the signaling overhead may be greater. In this example $\hat{H}_1^b$ may be a better estimate of $H_1$ than $\hat{H}_1^a$ and similarly for the other channels.

Now the network configures N=3 IMRs. During actual data transmission, when BS 1 is signal and BS 2 and BS 3 can act as interference. During actual data transmission, when BS 2 transmits only BS 3 can act as interference and BS 1 will be muted. When BS 3 transmits, BS 1 and 2 are muted. Thus set S1={BS 2, BS 3}, set S2={BS 3} and set S3={Null}. The received signal by the UE in the 3 IMRs are $$y_{IMR-1} = I_2 + I_3 + z$$

$$y_{IMR-2} = I_3 + z$$

$$y_{IMR-3} = z$$

The estimation of interference from using a pilot signal implementation may be improved over using CSI-RS alone, as the actual data interference is measured directly. Let N be the measured power of z, the out of CoMP set interference plus noise. With the help of these the UE can determine the following CQIs $$c_1^b \approx \log_2\left(1 + \frac{|\hat{H}_1^b s_1|^2}{I_2 + I_3 + N}\right)$$

$$c_2^b \approx \log_2\left(1 + \frac{|\hat{H}_2^b s_2|^2}{I_3 + N}\right)$$

$$c_3^b \approx \log_2\left(1 + \frac{|\hat{H}_3^b s_3|^2}{N}\right)$$

Thus the estimates of the CQIs may be improved.

Figure 10:
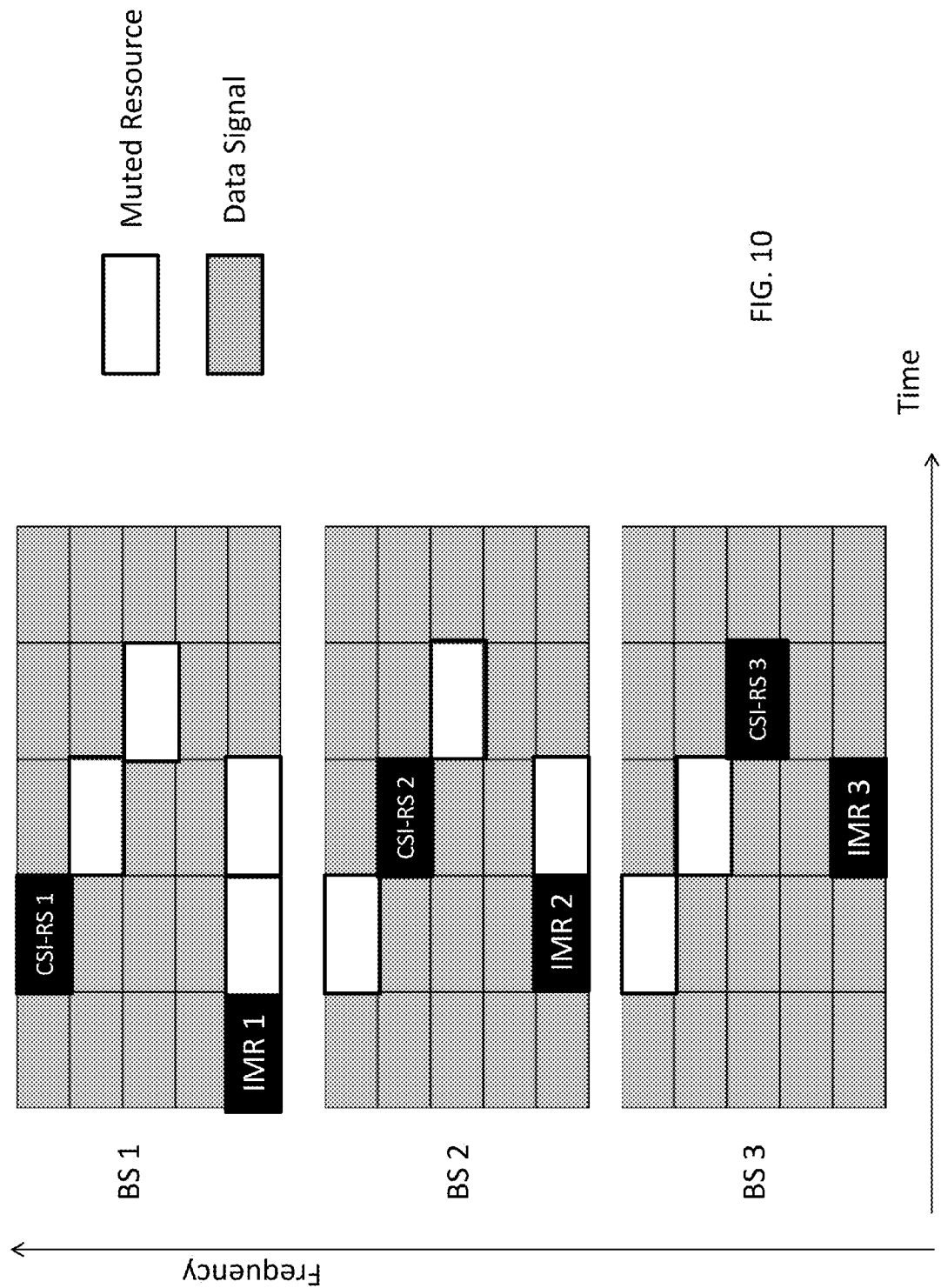
FIG. 10 illustrates example resource element schedules for each base station in a system implementing an example embodiment.

FIG. 10 illustrates example resource element schedules for each base station in a system implementing an example embodiment.

With reference to FIGS. 4(a) and 4(b), a resource element schedule can be provided for a serving base station and a collaborating base station in accordance with an example embodiment. Referring to FIGS. 9(a) and 9(b), the base stations can transmit data signals for resource elements that do not involve IMR or CSI-RS. When a base station is configured to transmit a pilot signal, example systems can determine if the pilot signal for a given resource element is to be CSI-RS or IMR. If the resource element is indicated as CSI-RS, the other base stations in the CoMP set may thereby be muted to allow for channel estimation. If the resource element is IMR, base stations with a stronger signal strength are muted, and base stations with a weaker signal strength continue to transmit data signals.

FIG. 11 illustrates an exemplary hardware configuration for a base station, in accordance with an example embodiment.

A base station 900 may utilize a transceiver module 901, a baseband signal processing module 902, and one or more Analog-Digital/Digital-Analog converters 904 for performing the modules described in FIG. 1 and FIG. 2. The transceiver module 901 may include a transmitter 901-1 and a receiver 901-2 for handling transmissions and receptions to the base station 900. The transceiver module 901 may be in the form of a radio frequency (R/F) front end as a hardware configuration.

The baseband signal processing module 902 may include a central processing unit (CPU) 902-1 and a memory 902-2.

Signals between the transceiver module 901 and the baseband signal processing module 902 may be processed by one or more Analog-Digital/Digital-Analog converters 904 through one or more interfaces 903.

The exemplary hardware configuration may be utilized for any of the serving base station 100 as depicted in FIG. 1 and the collaborating base station 200 as depicted in FIG. 2. For example, the baseband signal processing module 902 including the CPU 902-1 and memory 902-2 may be used to process the various modules such as CoMP modules 104, 204, as well as the CoMP scheduler modules 108, 208 and the RRM modules 103, 203 as depicted in FIG. 1 and FIG. 2. Communication via the backhaul modules 107, 207 may also be conducted through the baseband signal processing module 902 to facilitate communications through the backhaul.

Similar Tx modules 101, 201, and Rx modules 102, 202 may be implemented as a transceiver module 901 in the form of a radio frequency (R/F) front end. Various hardware configurations of transmitter 901-1 and receiver 902-2 may be utilized for facilitating communication with UEs. Further, the configuration of base station 900 is not limited to a radio frequency front end. One of ordinary skill in the art would be able to implement any type of physical front end as needed to facilitate communication between the base station and the UEs.

Finally, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example embodiments, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The example embodiments may also relate to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus.

Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of example embodiments of the invention may be implemented using circuits and logic devices (hardware), while other aspects may be implemented using instructions stored on a non-transitory computer readable medium, which if executed by a processor, would cause the processor to perform a method to carry out various example embodiments. Furthermore, some example embodiments may be performed solely in hardware, whereas other example embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the example embodiments will be apparent to those skilled in the art from consideration of the specification and practice of the invention disclosed herein. Various aspects and/or components of the described example embodiments may be used singly or in any combination. It is intended that the specification and examples be considered as exemplary only, with a true scope and spirit of the example embodiments being indicated by the following claims.

What is claimed is:

1. A base station, comprising:
a central processing unit (CPU) that is configured to:
when the base station is serving as a serving base station, determine a plurality of channel quality indicator (CQI) values for a coordinated multipoint transmission reception (CoMP) scheme for each user equipment (UE) associated with the base station based on a lower bound CQI value for at least one collaborating base station within a CoMP set of the base station with respect to at least one of the UE, the at least one collaborating base station configured to transition from a collaborating base station to the serving base station according to the CoMP scheme, and an upper bound CQI value for the base station with respect to the each UE for the base station serving as the serving base station;
transmit first instructions for muting ones of the at least one collaborating base station with a higher signal strength than a first one of the at least one collaborating base station with respect to the at least one of the UE;
transmit second instructions for instructing remaining ones of the at least one collaborating base station to transmit a pilot signal; and
receive a lower bound CQI value for the first one of the at least one collaborating base station with respect to the at least one of the UE based on the pilot signal;
and a front end handling transmissions and receptions between the base station and the each UE.

2. The base station of claim 1, wherein when the base station is serving as the serving base station and when a resource element of the pilot signal is IMR, the CPU is further configured to:
mute transmission of the serving base station for the resource element; and
transmit third instructions for the remaining ones of the at least one collaborating base station to transmit a data signal for the resource element.

3. The base station of claim 1, wherein the CPU is configured to determine, with respect to all of the at least one collaborating base station, one lower bound CQI value for the each UE, and
wherein the CPU is further configured to determine one upper bound CQI value for the each UE.

4. The base station of claim 1, wherein when the base station is serving as the serving base station and when a resource element of the pilot signal is a channel state information reference signal (CSI-RS), the CPU is further configured to:
transmit fourth instructions for muting all of the at least one collaborating base station;
transmit the channel state information reference signal (CSI-RS); and
determine a CQI value of the each UE as the upper bound CQI value for the base station with respect to the each UE.

5. The base station of claim 4, wherein when the base station is serving as the serving base station, the CPU is further configured to set an upper bound with respect to the each of the at least one collaborating base station by utilizing the upper bound of the base station with respect to the each UE adjusted by a weight, the weight being based on a radio resource management (RRM) measurement for the each of the at least one collaborating base station, and wherein the CPU is further configured to select a CoMP scheme based on the determined upper bound for each of the at least collaborating base station with respect to the each UE.

6. The base station of claim 1, wherein the CPU is further configured to determine if the base station is to serve as the serving base station or as a collaborating base station for the each UE based on a radio resource management (RRM) measurement.

7. The base station of claim 1, wherein when the base station is serving as a collaborating base station, the CPU is further configured to process a schedule for transmitting one of a channel state information reference signal (CSI-RS) and a data signal, or for muting when the at least one collaborating base station transmits one of the CSI-RS and the data signal.

8. A non-transitory computer readable medium storing instructions for operating a base station, the instructions comprising:

when the base station is serving as a serving base station:
determining a plurality of channel quality indicator (CQI) values for a coordinated multipoint transmission reception (CoMP) scheme for each user equipment (UE) associated with the base station based on a lower bound CQI value for at least one collaborating base station within a CoMP set of the base station with respect to at least one of the UE, the at least one collaborating base station configured to transition from a collaborating base station to the serving base station according to the CoMP scheme, and an upper bound CQI value for the base station with respect to the each UE for the base station serving as the serving base station;
transmitting first instructions for muting ones of the at least one collaborating base station with a higher signal strength than the first one of the at least one collaborating base station with respect to the at least one of the UE;
transmitting second instructions for instructing remaining ones of the at least one collaborating base station to transmit a pilot signal; and
receiving a lower bound CQI value for the first one of the at least one collaborating base station with respect to the at least one of the UE based on the pilot signal and,
handling transmissions and receptions between the base station and the each UE.

9. The non-transitory computer readable medium of claim 8, further comprising instructions for determining the lower bound for a first one of the at least one collaborating base station with respect to the at least one of the UE, when the base station is serving as the serving base station and when a resource element of the pilot signal is IMR, the instructions comprising:
muting transmission of the serving base station for the resource element; and
transmitting third instructions for the remaining ones of the at least one collaborating base station to transmit a data signal for the resource element.

10. The non-transitory computer readable medium of claim 8, further comprising instructions for determining the upper bound CQI value for the base station with respect to the each UE, when the base station is serving as the serving base station and when a resource element of the pilot signal is a channel state information reference signal (CSI-RS), the instructions comprising:
transmitting fourth instructions for muting all of the at least one collaborating base station;
transmitting the channel state information reference signal (CSI-RS); and
determining a CQI value of the each UE as the upper bound CQI value for the base station with respect to the each UE associated with the base station.

11. The non-transitory computer readable medium of claim 8, further comprising instructions to determine the upper bound for each of the at least one collaborating base station with respect to the each UE, when the base station is serving as the serving base station, the instructions comprising:
setting the upper bound with respect to the each of the at least one collaborating base station by utilizing the upper bound of the base station with respect to the each UE adjusted by a weight, the weight being based on a radio resource management (RRM) measurement for the each of the at least one collaborating base station;
wherein the non-transitory computer readable medium further comprises instructions to select a CoMP scheme based on the determined upper bound for each of the at least collaborating base station with respect to the each UE.

12. The non-transitory computer readable medium of claim 8, further comprising instructions for determining if the base station is to serve as the serving base station or as a collaborating base station for the each UE based on a radio resource management (RRM) measurement.

13. The non-transitory computer readable medium of claim 8, further comprising instructions for processing a schedule for transmitting one of a channel state information reference signal (CSI-RS) and a data signal, or for muting when the at least one collaborating base station transmits one of the CSI-RS and the data signal, when the base station is serving as a collaborating base station.

14. A system, comprising:
a serving base station comprising a front end handling transmissions and receptions between the base station and each user equipment (UE) associated with the serving base station, wherein the serving base station is configured to:
determine a plurality of channel quality indicator (CQI) values for a coordinated multipoint transmission reception (CoMP) scheme for the each UE associated with the serving base station based on a lower bound CQI value for at least one collaborating base station within a CoMP set of the base station with respect to at least one of the UE, the at last one collaborating base station configured to transition from a collaborating base station to the serving base station according to the CoMP scheme, and an upper bound CQI value for the serving base station with respect to the each UE;
transmit first instructions for muting ones of the at least one collaborating base station with a higher signal strength than a first one of the at least one collaborating base station with respect to the at least one of the UE;
transmit second instructions for instructing remaining ones of the at least one collaborating base station to transmit a pilot signal; and receive a lower bound CQI value for the first one of the at least one collaborating base station with respect to the at least one of the UE based on the pilot signal; and, the at least one collaborating base station.

15. The system of claim 14, wherein when a resource element of the pilot signal is IMR, the serving base station is further configured to:
   mute transmission of the serving base station for the resource element; and
   transmit third instructions for the remaining ones of the at least one collaborating base station to transmit a data signal for the resource element.

16. The system of claim 15, wherein the determining the lower bound CQI value for the first one of the at least one collaborating base station with respect to the at least one of the UE is based on a formula of:

$$\log_2\left(1 + \frac{|H*S|^2}{I+N}\right)$$

wherein H is a channel matrix of the first one of the at least one collaborating base station, S is the pilot signal transmitted, I is interference caused by the remaining ones of the at least one collaborating base station, and N is noise.

17. The system of claim 14, wherein when a resource element of the pilot signal is a channel state information reference signal (CSI-RS), the serving base station is further configured to:
   transmit fourth instructions for muting all of the at least one collaborating base station;
   transmit the channel state information reference signal (CSI-RS); and
   determine a CQI value of the each UE as the upper bound CQI value for the serving base station with respect to the each UE.

18. The system of claim 14, wherein the serving base station is further configured to set an upper bound with respect to the each of the at least one collaborating base station by utilizing the upper bound of the serving base station with respect to the each UE adjusted by a weight, the weight being based on a radio resource management (RRM) measurement for the each of the at least one collaborating base station, and
   wherein the serving base station is further configured to select a CoMP scheme based on the determined upper bound for each of the at least one collaborating base station with respect to the each UE.

19. The system of claim 14, wherein the serving base station is further configured to determine if the serving base station is to serve as the serving base station or as a collaborating base station for each UE based on a radio resource management (RRM) measurement.

20. The system of claim 14, wherein the at least one collaborating base station is further configured to process a schedule for transmitting one of a data signal and a channel state information reference signal (CSI-RS) or for muting when the at least one collaborating base station transmits one of the data signal and the CSI-RS.

* * * * *